United States Patent
Benison

(10) Patent No.: US 12,042,037 B2
(45) Date of Patent: Jul. 23, 2024

(54) VIRTUAL WIG DISPLAY ASSEMBLY

(71) Applicant: Ann Marie Benison, Greensboro, AL (US)

(72) Inventor: Ann Marie Benison, Greensboro, AL (US)

(*) Notice: Subject to any disclaimer, the term of this patent is extended or adjusted under 35 U.S.C. 154(b) by 415 days.

(21) Appl. No.: 17/564,996

(22) Filed: Dec. 29, 2021

(65) Prior Publication Data
US 2023/0200519 A1 Jun. 29, 2023

(51) Int. Cl.
| | | |
|---|---|---|
| A45D 44/00 | (2006.01) | |
| G06Q 30/0601 | (2023.01) | |
| G06T 19/00 | (2011.01) | |
| G06V 20/20 | (2022.01) | |
| G06V 40/16 | (2022.01) | |

(52) U.S. Cl.
CPC ....... *A45D 44/005* (2013.01); *G06Q 30/0621* (2013.01); *G06Q 30/0643* (2013.01); *G06T 19/006* (2013.01); *G06V 20/20* (2022.01); *G06V 40/161* (2022.01)

(58) Field of Classification Search
CPC ............ A47F 2007/195; A45D 44/005; G06Q 30/0621; G06Q 30/0643; G06T 19/006; G06V 20/20
See application file for complete search history.

(56) References Cited

U.S. PATENT DOCUMENTS

| | | | |
|---|---|---|---|
| 4,539,585 A | 9/1985 | Spackova | |
| 7,016,824 B2 | 3/2006 | Waupotitsch | |
| 8,107,672 B2* | 1/2012 | Goto | G06V 40/166 382/100 |
| 10,134,193 B2 | 11/2018 | Ahn | |
| 10,666,853 B2 | 5/2020 | Tomita | |
| D897,119 S | 9/2020 | Wu | |
| 2003/0063105 A1* | 4/2003 | Agnew | G06T 11/60 345/662 |
| 2018/0278879 A1 | 9/2018 | Saban | |
| 2020/0066052 A1* | 2/2020 | Antonsen | G06T 19/006 |
| 2020/0334868 A1* | 10/2020 | Zilly Claude | A45D 44/005 |
| 2020/0380594 A1* | 12/2020 | Ueda | G06Q 30/0643 |
| 2022/0286652 A1* | 9/2022 | Serval | H04N 9/3141 |
| 2023/0116929 A1* | 4/2023 | Zohar | G06F 18/214 345/633 |

FOREIGN PATENT DOCUMENTS

WO   WO2018019623   2/2018

* cited by examiner

Primary Examiner — Omkar A Deodhar

(57) ABSTRACT

A virtual wig display assembly includes a mirror and a display that is integrated into the mirror to display imagery. A first camera is integrated into the mirror to capture imagery of a user and a second camera is integrated into the mirror to capture imagery of the user. A plurality of light emitters is each attached to the mirror to emit light outwardly from the mirror. A transceiver is integrated into the mirror and the transceiver is in wireless communication with a personal electronic device for receiving a picture of a wig taken with the personal electronic device. The display superimposes the picture of the wig on a picture of the user thereby facilitating the user to view themselves with the wig.

7 Claims, 5 Drawing Sheets

FIG. 2
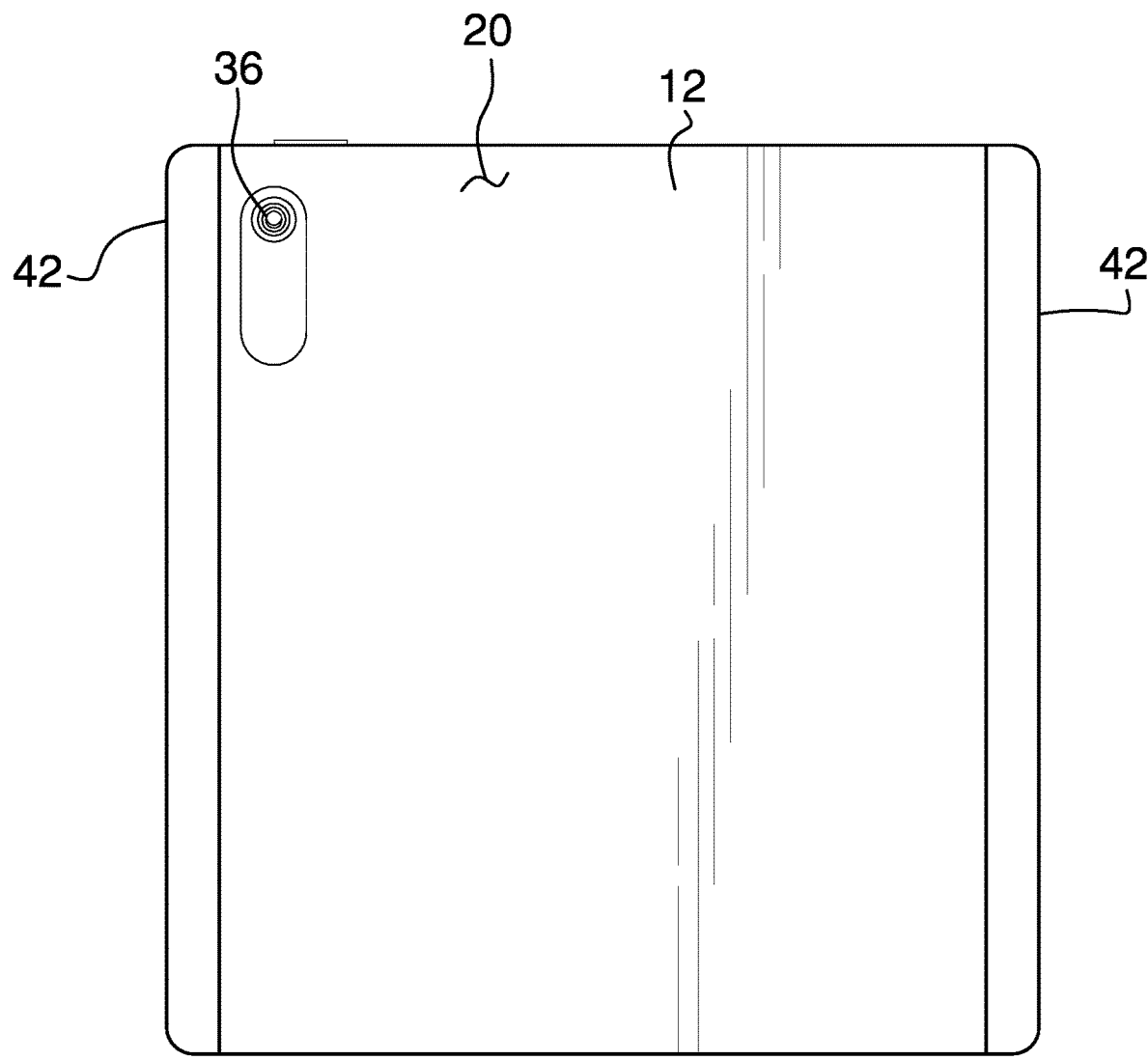
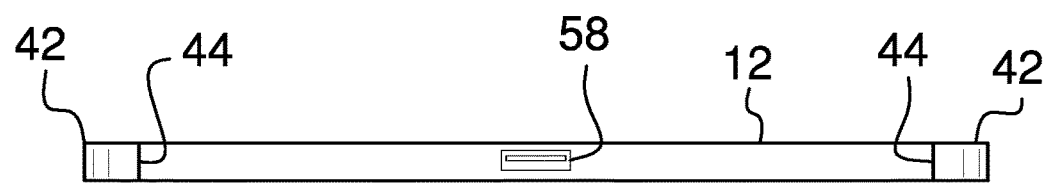
FIG. 3

VIRTUAL WIG DISPLAY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wig display devices and more particularly pertains to a new wig display device for displaying imagery of a wig on a user's head. The device includes a mirror with a pair of cameras each integrated into the mirror for capturing an image of a user. The device includes a transceiver for downloading an image of a wig that was captured by the user. The device includes a display that is integrated into the mirror and which displays an image of the wig superimposed on the image of the user.

(2) Description of Related Art Including Information Disclosed Under 37 CFR 1.97 and 1.98

The prior art relates to wig display devices including a virtual wardrobe device for superimposing clothing onto an image of a user. The prior art discloses a variety of makeup simulation devices that captures and subsequently displays an image of a user's face to facilitate makeup to be virtually applied to the image of the user's face. The prior art discloses a variety of smart mirror devices that each has an electronic display being integrated into a mirror and a camera integrated into the mirror for capturing and subsequently displaying an image of a user. Additionally, each of the smart mirror devices disclosed in the prior art employs a variety of image manipulation technology to facilitate clothing and hair styles to be virtually modified and displayed.

BRIEF SUMMARY OF THE INVENTION

An embodiment of the disclosure meets the needs presented above by generally comprising a mirror and a display that is integrated into the mirror to display imagery. A first camera is integrated into the mirror to capture imagery of a user and a second camera is integrated into the mirror to capture imagery of the user. A plurality of light emitters is each attached to the mirror to emit light outwardly from the mirror. A transceiver is integrated into the mirror and the transceiver is in wireless communication with a personal electronic device for receiving a picture of a wig taken with the personal electronic device. The display superimposes the picture of the wig on a picture of the user thereby facilitating the user to view themselves with the wig.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a back view of an embodiment of the disclosure.

FIG. 3 is a bottom view of an embodiment of the disclosure.

DETAILED DESCRIPTION OF THE INVENTION

Figure 1:
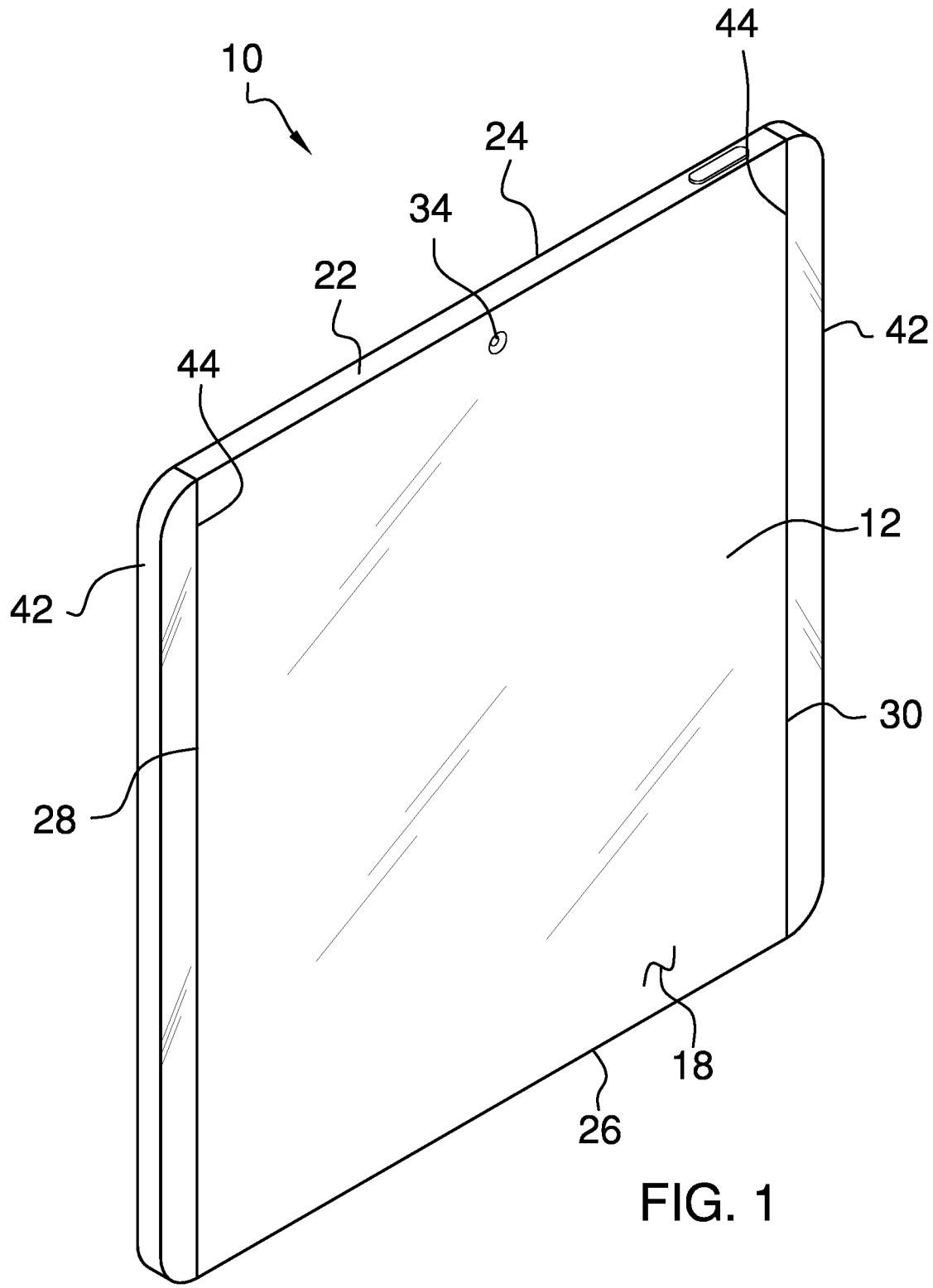
FIG. 1 is a front perspective view of a virtual wig display assembly according to an embodiment of the disclosure.
Figure 4:
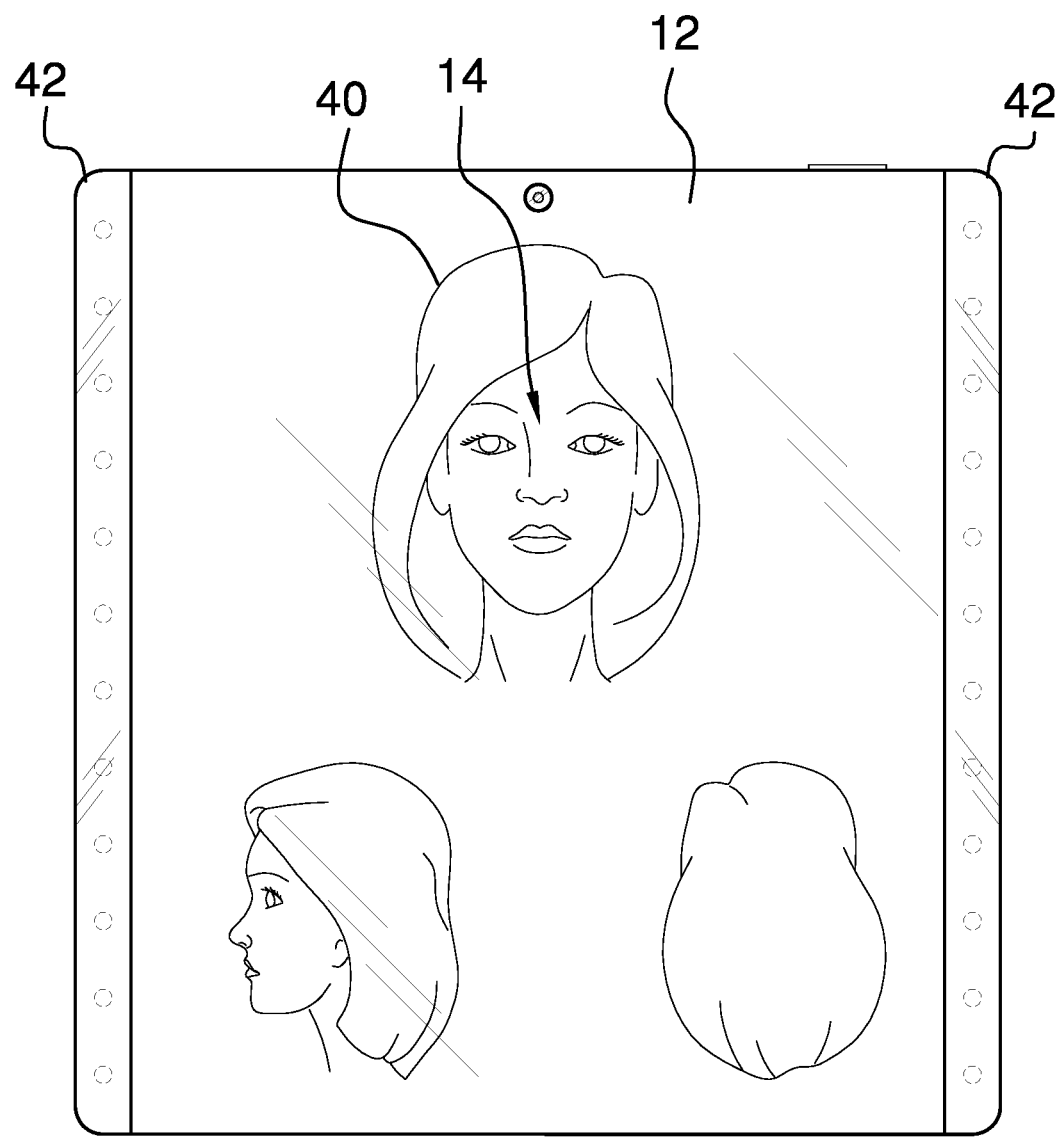
FIG. 4 is a front in-use view of an embodiment of the disclosure.
Figure 5:
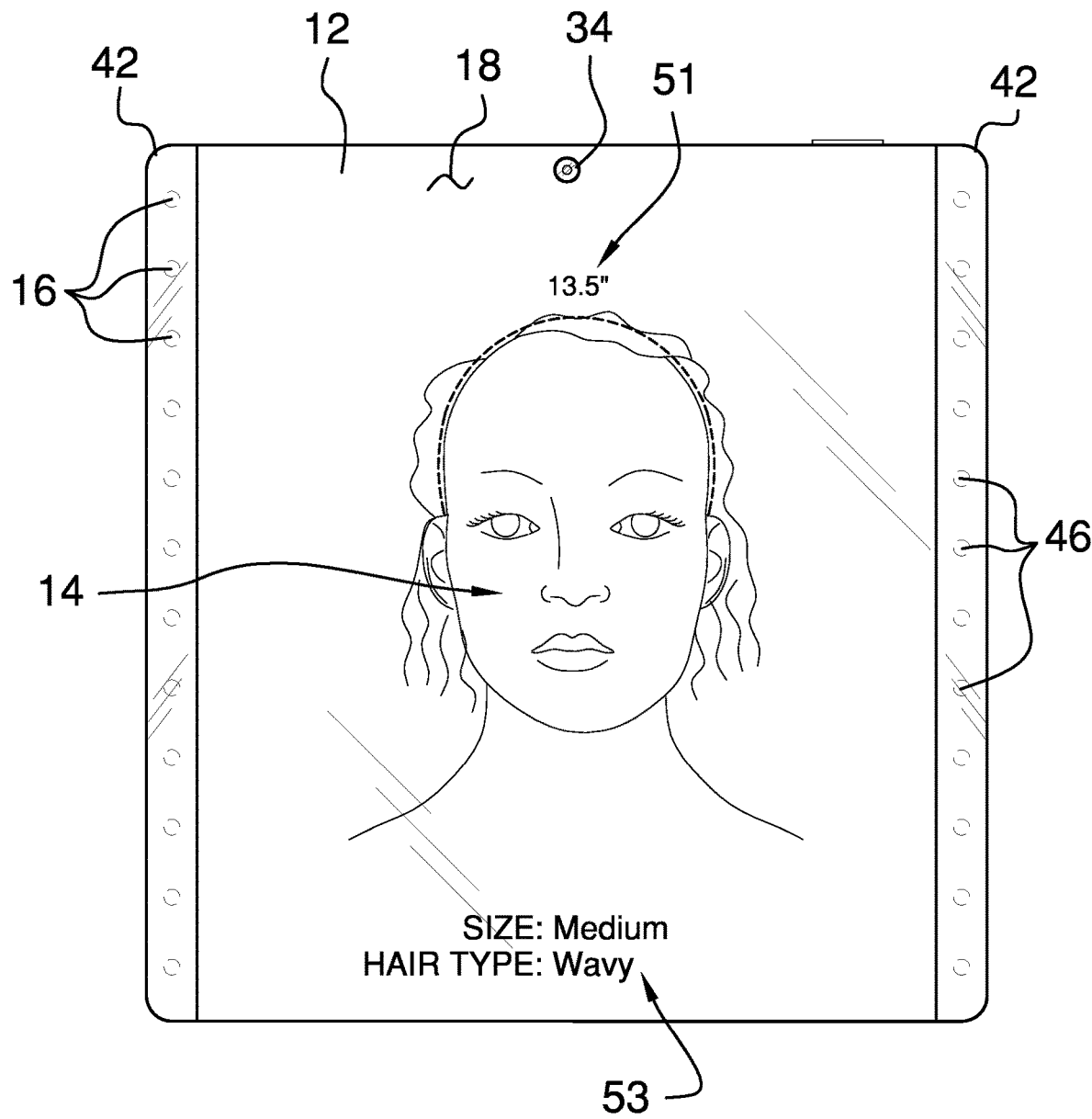
FIG. 5 is a front view of an embodiment of the disclosure.
Figure 6:
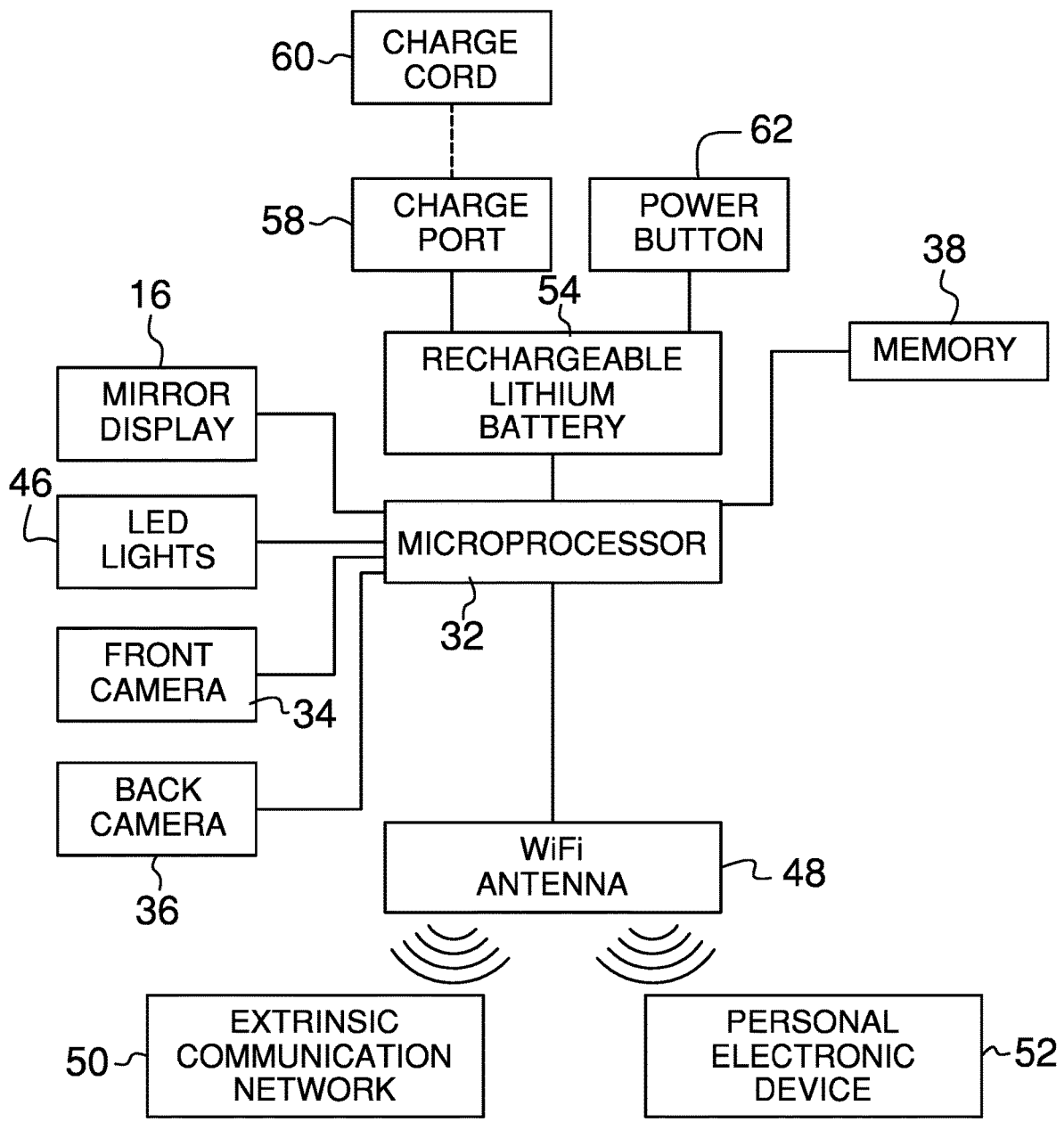
FIG. 6 is a schematic view of an embodiment of the disclosure.

With reference now to the drawings, and in particular to FIGS. 1 through 6 thereof, a new wig display device embodying the principles and concepts of an embodiment of the disclosure and generally designated by the reference numeral 10 will be described.

As best illustrated in FIGS. 1 through 6, the virtual wig display assembly 10 generally comprises a mirror 12 that is positionable in a vertical orientation such that the mirror 12 can be viewed by a user 14. The mirror 12 might be positioned in a retail environment that sells wigs. The mirror 12 has a display 16 that is integrated into the mirror 12 to display imagery. The display 16 may comprise a translucent liquid crystal display or other type of electronic display that would facilitate the mirror 12 to function normally. The mirror 12 has a front surface 18, a back surface 20 and a perimeter edge 22 extending between the front surface 18 and the back surface 20, and the perimeter edge 22 has a top side 24, a bottom side 26, a first lateral side 28 and a second lateral side 30. A control circuit 32 is integrated into the mirror 12 and the control circuit 32 is electrically coupled to the display 16 that is integrated into the mirror 12.

A first camera 34 is integrated into the mirror 12 thereby facilitating the first camera 34 to capture imagery of the user 14. The first camera 34 is recessed into the front surface 18 of the mirror 12 and the first camera 34 is electrically coupled to the control circuit 32. A second camera 36 is integrated into the mirror 12 thereby facilitating the second camera 36 to capture imagery of the user 14. The second camera 36 is recessed into the back surface 20 of the mirror 12 and the second camera 36 is electrically coupled to the control circuit 32. Each of the first camera 34 and the second camera 36 may comprise a digital camera of any conventional design.

An electronic memory 38 is integrated into the mirror 12 and the electronic memory 38 is electrically coupled to the control circuit 32. The electronic memory 38 stores hair recognition software for analyzing types of hair, including but not being limited to, wavy hair, straight hair and curly hair. The electronic memory 38 stores distance measuring software for measuring the curvature of the user's head as well as determining the proper size of wig 40 for the user's head. The electronic memory 38 stores image manipulation software for facilitating the image of the user 14 and a wig 40 superimposed on the user 14 to be rotated 360.0 degrees. In this way the user 14 can view themselves wearing the wig 40 in a virtual manner. As is most clearly shown in FIG. 5, A pair of light housings 42 is provided and each of the light housings 42 has a first side 44 which is attached to a respective one of the first lateral side 28 and the second lateral side 30 of the perimeter edge 22 of the mirror 12. Each of the light housings 42 is coextensive with the respective first lateral side 28 and the second lateral side 30. Additionally, each of the light housings 42 is comprised of a translucent material to pass light through the light housings 42. A plurality of light emitters 46 is each attached to the mirror 12 to emit light outwardly from the mirror 12. Furthermore, each of the light emitters 46 is positioned within a respective one of the light housings 42 and each of the light emitters 46 is spaced apart from each other and is distributed along a full length of the respective light housing 42. Each of the light emitters 46 is electrically coupled to the control circuit 32 and each of the light emitters 46 may comprise a light emitting diode or other type of electronic light emitter.

A transceiver 48 is integrated into the mirror 12 and the transceiver 48 is in wireless communication with an extrinsic communication network 50. The extrinsic communication network 50 may comprise the internet, a cellular phone network or any other type of wireless communication network. The transceiver 48 is in wireless communication with a personal electronic device 52 for receiving a picture of a wig 40 taken with the personal electronic device 52. In this way the display 16 can superimpose the picture of the wig 40 on a picture of the user 14 thereby facilitating the user 14 to view themselves with the wig 40. The personal electronic device 52 may comprise a smart phone or other type of device that has ability to take digital photos and wireless communication capabilities.

The distance measuring software in the electronic memory 38 analyzes the picture of the wig 40 that is superimposed on the picture of the user 14. Moreover, the measuring software measures the size of the wig 40 that would be appropriate for the user 14. As is most clearly shown in FIG. 5, the display 16 displays measuring indicia 51 corresponding to the measurement determined by the measuring software. In this way the display 16 can communicate the measurement to the user 14 thereby facilitating the user 14 to purchase a properly sized wig 40. As is additionally shown in FIG. 5, the display 16 may display indicia 53 comprising the type of hair style that is identified by the hair recognition software and the display may display the size of the wig with respect to small, medium or large. The transceiver 48 is electrically coupled to the control circuit 32 and the transceiver 48 may comprise a radio frequency transceiver or the like. Additionally, the transceiver 48 may employ a WPAN signal to facilitate the transceiver 48 to communication with a wireless internet router thereby facilitating the transceiver 48 to communicate with the personal electronic device 52. Additionally, the transceiver 48 may employ Bluetooth communication protocols such that the personal electronic device 52 can by synched with the transceiver 48.

A power supply 54 is integrated into the mirror 12 and the power supply 54 is electrically coupled to the control circuit 32. The power supply 54 comprises at least one rechargeable battery 56 that is positioned within the mirror 12 and the at least one rechargeable battery 56 is electrically coupled to the control circuit 32. The power supply 54 includes a charge port 58 that is recessed into the mirror 12 to insertably receive a charge cord 60. The charge port 58 is electrically coupled to the at least one rechargeable battery 56 for charging the at least one rechargeable battery 56. The power supply 54 includes a power button 62 that is movably integrated into the mirror 12 and the power button 62 is electrically coupled to the control circuit 32 for turning the control circuit 32 on and off.

In use, the user 14 takes a picture of a wig 40 and the user 14 downloads the picture of the wig 40 into the electronic memory 38 in the mirror 12. The user 14 stands in front of the first camera 34 or the second camera 36, depending on the user's 14 preference, to take a photo of themselves. The display 16 displays the photo of the user 14 with the picture of the wig 40 superimposed on the user 14. Moreover, the measuring software analyzes the photo of the user 14 wearing the wig 40 and the display 16 displays the proper measurement for the wig 40. In this way the user 14 can purchase the proper size of wig 40 for themselves. Additionally, the image manipulation software facilitates the user 14 to view themselves from a variety of angles to ensure that the wig 40 will present the appearance that the user 14 desires.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A virtual wig display assembly for displaying a variety of wigs superimposed on an image of a user, said assembly comprising:
    a mirror being positionable in a vertical orientation wherein said mirror is configured to be viewed by a user, said mirror having a display being integrated into said mirror wherein said display is configured to display imagery;
    an electronic memory being integrated into said mirror, said electronic memory storing hair recognition software, said electronic memory storing distance measuring software, said electronic memory storing image manipulation software;
    a first camera being integrated into said mirror wherein said first camera is configured to capture imagery of the user;
    a second camera being integrated into said mirror wherein said second camera is configured to capture imagery of the user;
    a plurality of light emitters, each of said light emitters being attached to said mirror wherein each of said light emitters is configured to emit light outwardly from said mirror; and
    a transceiver being integrated into said mirror wherein said transceiver is configured to be in wireless communication with an extrinsic communication network, said transceiver being in wireless communication with a personal electronic device for receiving a picture of a wig taken with the personal electronic device wherein said display is configured to superimpose the picture of the wig on a picture of the user thereby facilitating the user to view themselves with the wig, said distance measuring software in said electronic memory analyzing the picture of the wig superimposed on the picture of the user wherein said measuring software is configured to measure the size of the wig that would be appropriate for the user, said display displaying measuring indicia corresponding to the measurement determined by said measuring software wherein said display is configured to communicate the measurement to the user thereby facilitating the user to purchase a properly sized wig.

2. The assembly according to claim 1, wherein:
    said mirror has a front surface, a back surface and a perimeter edge extending between said front surface and said back surface, said perimeter edge having a top side, a bottom side, a first lateral side and a second lateral side;
    said display is integrated into said front surface of said mirror wherein said display is configured to be visible to the user;
    said first camera is recessed into said front surface of said mirror; and
    said second camera is recessed into said back surface of said mirror.

3. The assembly according to claim 2, further comprising a pair of light housings, each of said light housings having a first side, said first side of each of said light housings being attached to a respective one of said first lateral side and said second lateral side of said perimeter edge of said mirror, each of said light housings being coextensive with said respective first lateral side and said second lateral side, each of said light housings being comprised of a translucent material wherein each of said light housings is configured to pass light through said light housings.

4. The assembly according to claim 3, wherein each of said light emitters is positioned within a respective one of said light housings, each of said light emitters being spaced apart from each other and being distributed along a full length of said respective light housing.

5. The assembly according to claim 1, further comprising:
    a control circuit being integrated into said mirror, said control circuit being electrically coupled to said first camera, said second camera, said electronic memory, each of said light emitters and said transceiver; and
    a power supply being integrated into said mirror, said power supply being electrically coupled to said control circuit, said power supply comprising:
        at least one rechargeable battery being positioned within said housing, said at least one rechargeable battery being electrically coupled to said control circuit;
        a charge port being recessed into said mirror wherein said charge port is configured to insertably receive a charge cord, said charge port being electrically coupled to said at least one rechargeable battery for charging said at least one rechargeable battery; and
        a power button being movably integrated into said mirror, said power button being electrically coupled to said control circuit for turning said control circuit on and off.

6. A virtual wig display assembly for displaying a variety of wigs superimposed on an image of a user, said assembly comprising:
    a mirror being positionable in a vertical orientation wherein said mirror is configured to be viewed by a user, said mirror having a display being integrated into said mirror wherein said display is configured to display imagery, said mirror having a front surface, a back surface and a perimeter edge extending between said front surface and said back surface, said perimeter edge having a top side, a bottom side, a first lateral side and a second lateral side;
    a control circuit being integrated into said mirror, said control circuit being electrically coupled to said display being integrated into said mirror;
    an electronic memory being integrated into said mirror, said electronic memory being electrically coupled to said control circuit, said electronic memory storing hair recognition software, said electronic memory storing distance measuring software, said electronic memory storing image manipulation software;
    a first camera being integrated into said mirror wherein said first camera is configured to capture imagery of the user, said first camera being recessed into said front surface of said mirror, said first camera being electrically coupled to said control circuit;
    a second camera being integrated into said mirror wherein said second camera is configured to capture imagery of the user, said second camera being recessed into said back surface of said mirror, said second camera being electrically coupled to said control circuit;
    a pair of light housings, each of said light housings having a first side, said first side of each of said light housings being attached to a respective one of said first lateral side and said second lateral side of said perimeter edge of said mirror, each of said light housings being coextensive with said respective first lateral side and said second lateral side, each of said light housings being comprised of a translucent material wherein each of said light housings is configured to pass light through said light housings;

a plurality of light emitters, each of said light emitters being attached to said mirror wherein each of said light emitters is configured to emit light outwardly from said mirror, each of said light emitters being positioned within a respective one of said light housings, each of said light emitters being spaced apart from each other and being distributed along a full length of said respective light housing, each of said light emitters being electrically coupled to said control circuit;

a transceiver being integrated into said mirror wherein said transceiver is configured to be in wireless communication with an extrinsic communication network, said transceiver being in wireless communication with a personal electronic device for receiving a picture of a wig taken with the personal electronic device wherein said display is configured to superimpose the picture of the wig on a picture of the user thereby facilitating the user to view themselves with the wig, said distance measuring software in said electronic memory analyzing the picture of the wig superimposed on the picture of the user wherein said measuring software is configured to measure the size of the wig that would be appropriate for the user, said display displaying measuring indicia corresponding to the measurement determined by said measuring software wherein said display is configured to communicate the measurement to the user thereby facilitating the user to purchase a properly sized wig, said transceiver being electrically coupled to said control circuit; and a power supply being integrated into said mirror, said power supply being electrically coupled to said control circuit, said power supply comprising:
  at least one rechargeable battery being positioned within said housing, said at least one rechargeable battery being electrically coupled to said control circuit;
  a charge port being recessed into said mirror wherein said charge port is configured to insertably receive a charge cord, said charge port being electrically coupled to said at least one rechargeable battery for charging said at least one rechargeable battery; and
  a power button being movably integrated into said mirror, said power button being electrically coupled to said control circuit for turning said control circuit on and off.

7. A virtual wig display system for displaying a variety of wigs superimposed on an image of a user, said system comprising:
  a personal electronic device having a digital camera being integrated into said personal electronic device for capturing an image of a wig;
  a mirror being positionable in a vertical orientation wherein said mirror is configured to be viewed by a user, said mirror having a display being integrated into said mirror wherein said display is configured to display imagery, said mirror having a front surface, a back surface and a perimeter edge extending between said front surface and said back surface, said perimeter edge having a top side, a bottom side, a first lateral side and a second lateral side;
  a control circuit being integrated into said mirror, said control circuit being electrically coupled to said display being integrated into said mirror;
  an electronic memory being integrated into said mirror, said electronic memory being electrically coupled to said control circuit, said electronic memory storing hair recognition software, said electronic memory storing distance measuring software, said electronic memory storing image manipulation software;
  a first camera being integrated into said mirror wherein said first camera is configured to capture imagery of the user, said first camera being recessed into said front surface of said mirror, said first camera being electrically coupled to said control circuit;
  a second camera being integrated into said mirror wherein said second camera is configured to capture imagery of the user, said second camera being recessed into said back surface of said mirror, said second camera being electrically coupled to said control circuit;
  a pair of light housings, each of said light housings having a first side, said first side of each of said light housings being attached to a respective one of said first lateral side and said second lateral side of said perimeter edge of said mirror, each of said light housings being coextensive with said respective first lateral side and said second lateral side, each of said light housings being comprised of a translucent material wherein each of said light housings is configured to pass light through said light housings;
  a plurality of light emitters, each of said light emitters being attached to said mirror wherein each of said light emitters is configured to emit light outwardly from said mirror, each of said light emitters being positioned within a respective one of said light housings, each of said light emitters being spaced apart from each other and being distributed along a full length of said respective light housing, each of said light emitters being electrically coupled to said control circuit;
  a transceiver being integrated into said mirror wherein said transceiver is configured to be in wireless communication with an extrinsic communication network, said transceiver being in wireless communication with said personal electronic device for receiving a picture of a wig taken with said personal electronic device wherein said display is configured to superimpose the picture of the wig on a picture of the user thereby facilitating the user to view themselves with the wig, said distance measuring software in said electronic memory analyzing the picture of the wig superimposed on the picture of the user wherein said measuring software is configured to measure the size of the wig that would be appropriate for the user, said display displaying measuring indicia corresponding to the measurement determined by said measuring software wherein said display is configured to communicate the measurement to the user thereby facilitating the user to purchase a properly sized wig, said transceiver being electrically coupled to said control circuit; and
  a power supply being integrated into said mirror, said power supply being electrically coupled to said control circuit, said power supply comprising:
    at least one rechargeable battery being positioned within said housing, said at least one rechargeable battery being electrically coupled to said control circuit;
    a charge port being recessed into said mirror wherein said charge port is configured to insertably receive a charge cord, said charge port being electrically coupled to said at least one rechargeable battery for charging said at least one rechargeable battery; and
    a power button being movably integrated into said mirror, said power button being electrically coupled to said control circuit for turning said control circuit on and off.

* * * * *